D. T. WALSH.
BACK UP BRAKE FOR VEHICLES.
APPLICATION FILED APR. 12, 1910.
978,966.
Patented Dec. 20, 1910.
3 SHEETS—SHEET 1.
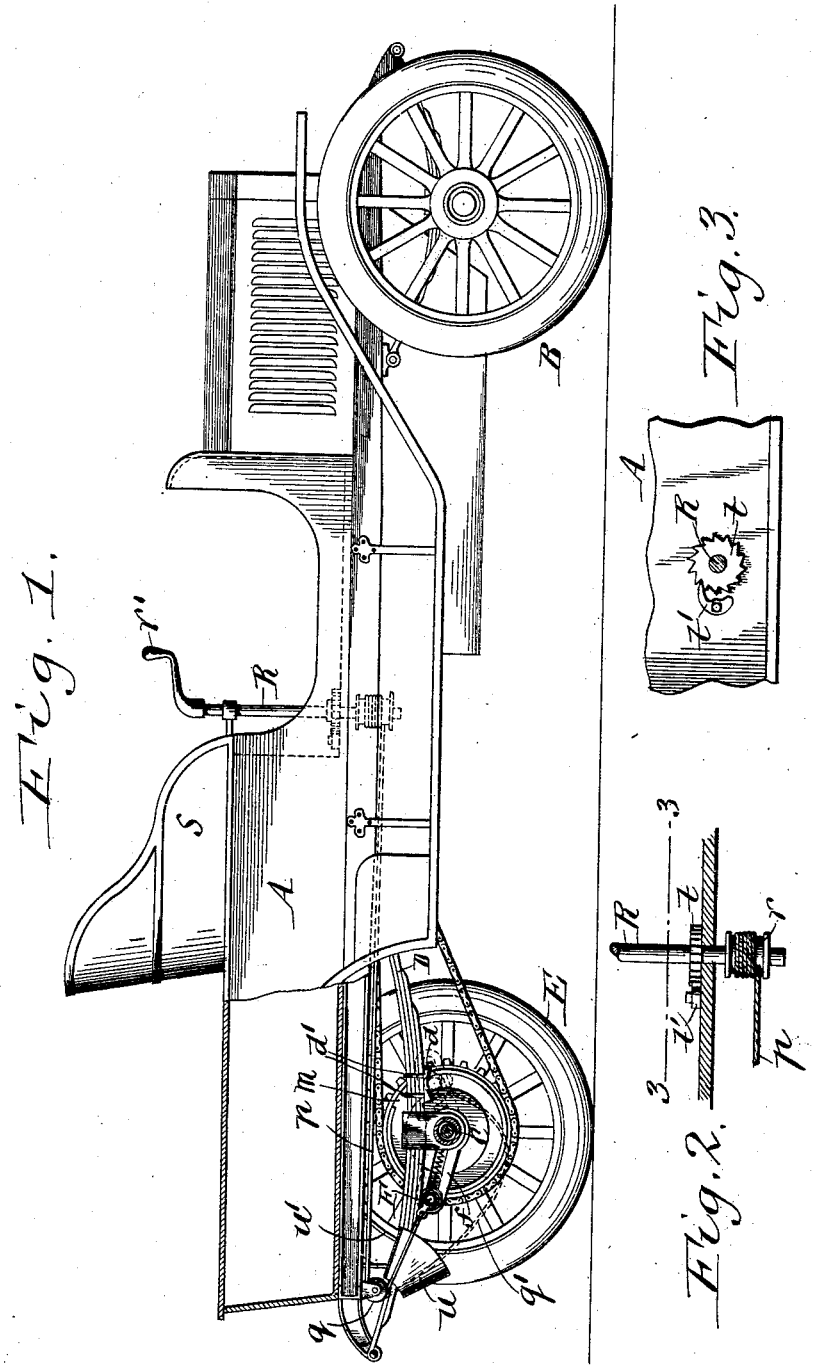

D. T. WALSH.
BACK UP BRAKE FOR VEHICLES.
APPLICATION FILED APR. 12, 1910.
978,966.
Patented Dec. 20, 1910.
3 SHEETS—SHEET 2.
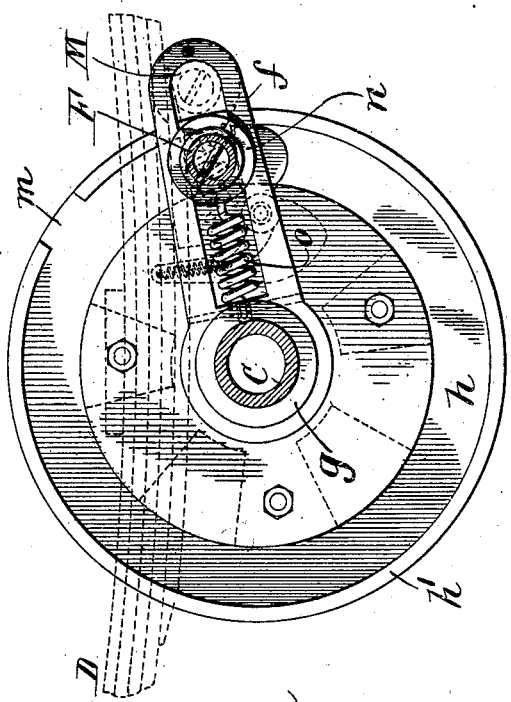
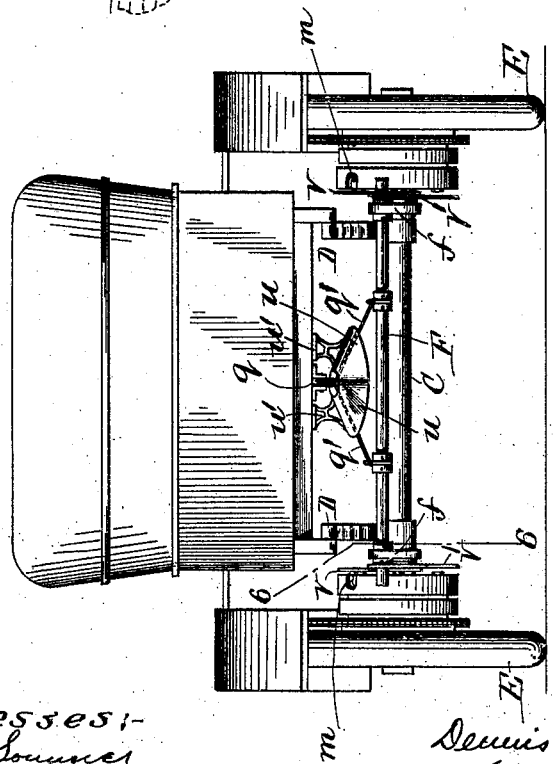
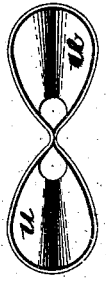
Witnesses:
Richard Sommer
Alfred Borkenhagen
Inventor
Dennis T. Walsh
by Geyer & Popp
Attorneys

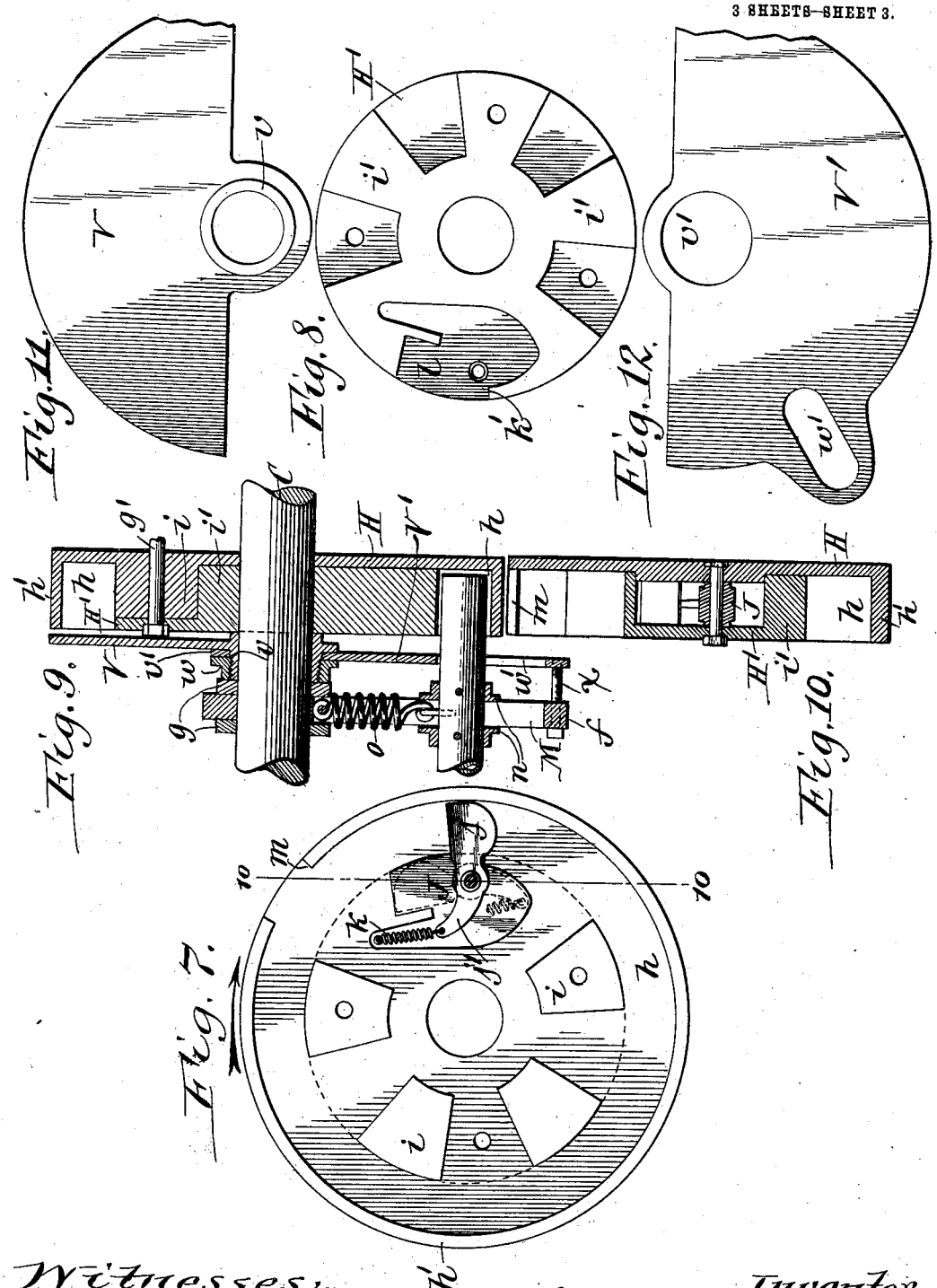
D. T. WALSH.
BACK UP BRAKE FOR VEHICLES.
APPLICATION FILED APR. 12, 1910.
978,966.
Patented Dec. 20, 1910.
3 SHEETS—SHEET 3.

UNITED STATES PATENT OFFICE.

DENNIS T. WALSH, OF ANSONIA, CONNECTICUT.

BACK-UP BRAKE FOR VEHICLES.

978,966.      Specification of Letters Patent.      Patented Dec. 20, 1910.

Application filed April 12, 1910. Serial No. 554,920.

*To all whom it may concern:*

Be it known that I, DENNIS T. WALSH, a citizen of the United States, residing at Ansonia, in the county of New Haven and State of Connecticut, have invented new and useful Improvements in Back - Up Brakes for Vehicles, of which the following is a specification.

This invention relates to a device for preventing an automobile or other vehicle from moving backwardly when it is desired to prevent such movement. This is particularly desirable when running an automobile up hill and there is a possibility of the engine becoming stalled or other parts becoming deranged, in which event the automobile would back up or down hill and endanger the safety of the machine and its passengers if no provision were made to prevent such backing up.

It is the object of this invention to provide a device of this character whereby an automobile is positively prevented from backing up but which can be thrown out of action when desired, so that the machine can be moved forward and backward without interference from this device.

In the accompanying drawings consisting of 3 sheets: Figure 1 is a side elevation partly in section, of an automobile equipped with my invention, and showing the same in an inoperative position. Fig. 2 is a fragmentary vertical section showing the hand operated shaft and associated parts whereby the operation of the back up brake is controlled. Fig. 3 is a horizontal section in line 3—3, Fig. 2. Fig. 4 is a rear elevation of an automobile embodying my invention. Fig. 5 is a bottom plan view of the means for guiding the draft member whereby the backup brake is controlled. Fig. 6 is a vertical section, on an enlarged scale, taken in line 6—6, Fig. 4, with the cover omitted and showing the parts in the position which they occupy while arresting the backward movement of the machine. Fig. 7 is a detached elevation of one section of one of the clutches, whereby the brake rod is supported and pushed against a relatively stationary part of the automobile. Fig. 8 is a similar view of the other section of the clutch. Fig. 9 is a fragmentary section taken lengthwise of one of the driving axles and showing the brake rod in position to be moved by the clutch into engagement with a stationary part of the automobile, and also showing the cover for closing the grooved side of the clutch. Fig. 10 is a section taken in line 10—10, Fig. 7. Figs. 11 and 12 are detached side elevations of the sections of the cover for closing the grooved side of the clutch.

Similar letters of reference indicate corresponding parts throughout the several views.

My invention is applicable to automobiles or vehicles of various constructions, that shown in the drawings for illustrating the invention comprising a body A, steering wheels B supporting the front end of the body, a transverse driving axle C arranged underneath the rear part of the body and adapted to be driven by an engine mounted on the body, semi-elliptical main springs D connecting the axle near its opposite ends with the body and driving wheels E mounted at opposite ends of the axle.

In its general organization my invention comprises a brake, chock or locking member which is adapted to be interposed between a relatively stationary or fixed part of the automobile and a rotatable part of the machine.

Although my invention is applicable to various parts of the automobile it is preferably associated with the rear or driving wheels of the automobile, the axle connecting these wheels and the springs connecting this axle with the body and the same is therefore shown in this relation in the drawings.

F represents a braking or locking member which is preferably constructed in the form of a rod or bar arranged parallel with the rear or driving axle of the vehicle. This brake rod is adapted to revolve with the axle and driving wheels during the backward movement of these parts and cause the brake rod to engage with the underside of the main springs and thereby lock the driving wheels against backward rotation. The brake rod is supported near its opposite ends by means of arms *f* which are pivoted loosely on the axle so that the brake rod can remain at rest while the driving axle and wheels rotate and the back up brake is in an inoperative condition. Each of the supporting arms *f* is held against moving lengthwise on the axle by means of collars *g* secured to the axle on opposite sides of this arm.

At its opposite ends the brake rod is adapted to engage with the annular grooves $h$ formed concentrically on the inner sides of two clutches which are mounted on the adjacent parts of the driving axle, wheels, brake drums or other suitable rotatable part so as to turn with the same. Each of these clutches preferably consists of an outer large disk H having an annular inwardly projecting flange $h^1$ at its periphery, an annular row of coupling lugs $i$ arranged around the central part of its inner side and a small inner disk $H^1$ which is provided on its outer side with a plurality of lugs $i^1$ interlocking with those of the outer disk and which is separated at its periphery from the flange of the outer disk to form the annular groove $h$ of this clutch. These two disks of each clutch may be connected with each other and with the adjacent driving wheel of the vehicle by any suitable means but preferably by means of bolts $g^1$, as shown in Figs. 4, 6 and 9.

J represents a pawl which is pivoted between the sections or disks of the clutch and provided on one side of its pivot with a jaw $j$ which is adapted to move laterally into and out of the groove of the clutch and on the opposite sides of its pivot with a tail $j^1$ which is connected by a spring $k$ with the sections of the clutch. Normally the pawl spring $k$ turns the pawl, so that its jaw projects across the path of the groove $h$ in the clutch, as shown by full lines in Fig. 7, the movement of the pawl in this direction being limited by means of a shoulder or stop $k^1$ formed on the inner part or section of the clutch. The pawl is free to turn in the direction for swinging its jaw inwardly out of the groove, as shown by dotted lines in Fig. 7, for which purpose the adjacent part of the clutch is provided between its disks with a recess $l$ for the reception of the jaw. Assuming that the brake rod is arranged at its opposite ends in the grooves of the clutches the forward movement of the automobile or vehicle will not be interfered with inasmuch as each clutch at this time turns in the direction of the arrow in Fig. 7 and the back side of the jaw of its pawl will engage the relatively stationary brake rod in the groove and clear the same by reason of the pawl jaw swinging back into the recess $l$ of the clutch. After the pawl clears the brake rod the same will be again projected by a spring $k$ across the groove, this operation being repeated during each turn of the clutch. If the automobile or vehicle should move backwardly while the parts are in this position, the front side of the jaw of the pawl engages the brake rod and as the latter is at this time held rigidly against deflection out of the groove by means of the shoulder or stop $k^1$ the brake rod is compelled to turn with the clutch. This movement of the brake rod with the clutch continues until the brake rod engages with the underside of the adjacent part of the rear supporting spring of the vehicle, as shown in Fig. 6, thereby positively arresting or blocking the continued backward turning of the clutch and preventing backward movement of the vehicle. For the purpose of saving the main spring D from undue wear and strain incident to stopping the backward movement of the vehicle, each of these springs is provided with a wearing plate or saddle $d$ which is adapted to be engaged by the adjacent parts of the brake rod. This wearing plate is secured to the main spring in any suitable manner, for instance, by means of clips $d^1$, as shown in Fig. 1. If, after thus arresting the backward movement of the automobile, the same is again moved forwardly this brake mechanism will not interfere with such movement inasmuch as the pawl J at this time simply trips idly past the brake rod but is always ready to catch the brake rod and press the same against the main springs, if this becomes necessary.

Inasmuch as it is undesirable to have the brake rod constantly in the grooves of the clutches where it would be struck repeatedly by the pawls J during each rotation of the clutches, means are provided for moving the brake rod out of these grooves and holding the same in a retracted position whenever the car is traveling over an even road and only permitting said brake rod to enter the grooves of the clutches preparatory to climbing a hill or steep road, so that backing up of the vehicle is prevented if this should occur. For this purpose the peripheral flanges of the clutches are provided with passageways or notches $m$ through which the ends of the brake rod pass radially into and out of the grooves of the clutches. The supporting arms $f$ are also provided with radial ways M in which the brake rod moves radially upon entering and leaving the annular grooves of the clutches. The ways of the supporting arms are preferably constructed in the form of slots in which the brake rod slides in moving toward and from the axle but is held against movement in a direction lengthwise of the axle by means of collars $n$ secured to the brake rod on opposite sides of each supporting arm, as shown in Figs. 6 and 9. The brake rod is yieldingly held in its innermost position in which its opposite ends are arranged in the grooves of the clutches, this being preferably effected by means of springs $o$ each of which is arranged within the inner part of the slot M of one of the supporting arms and is connected at its inner end with the inner part of this arm while the outer end thereof is connected with the adjacent part of the brake rod.

When it is desired to withdraw the brake rod from the clutches and thus avoid the wear and noise incident to the tripping of the pawls upon reaching the brake rod during each revolution of the clutches, the brake rod is moved outwardly in the slots M of the supporting arms and through the passageway in the flanges of the clutches, so that the brake rod is arranged outside of the periphery of the clutches, as shown in Figs. 1 and 4. This movement of the brake rod is preferably effected by means of a flexible draft member consisting preferably of a chain which has a single upper run $p$ arranged lengthwise under the body of the vehicle and passing with its rear part downwardly and forwardly around a supporting roller $q$ mounted on the underside of the body in rear of the axle and a bifurcated lower run $q^1$ connecting with the upper run of the draft member and secured to the brake rod on opposite sides of its center, as shown in Figs. 1 and 4. Upon pulling forwardly on the upper run of the draft member the lower branches or sections thereof are caused to pull rearwardly on the brake bar, thereby causing the latter to be drawn rearwardly or outwardly through the passageways of the clutch flanges the instant these passageways, during the rotation of the clutches, come in line with the path of the brake rod. The forward pull of the draft member is preferably effected by means of an upright shaft R journaled on the body and provided at its lower end with a drum $r$ upon which the upper run of the draft member is wound and a crank or handle $r^1$ mounted on the upper end of the shaft adjacent to the driver's seat $s$ so as to be within convenient reach of the driver. The hand shaft is prevented from turning backwardly together with the drum and thus hold the brake rod out of engagement from the grooves of the clutches by means of a ratchet wheel $t$ secured to the hand shaft and a dog $t^1$ pivoted on the body and engaging the teeth of the ratchet wheel, as shown in Figs. 2 and 3. The parts are retained by the chauffeur in this position so long as the car is traveling over even ground. But when a hill or steep road is in prospect the driver disengages the dog $t^1$ from the ratchet wheels $t$ so as to permit the draft member to unwind from the drum and the springs $o$ to draw the brake rod through the passageways in the clutches when these passageways are brought in line with the brake rod during the first rotation of the clutches following the release of the dog $t^1$. The mechanism is then ready for use and operates automatically to prevent backward movement of the automobile beyond a very short distance which is no more than one half a turn of the driving wheels, thereby preventing the automobile from acquiring any considerable speed when moving backward before it is positively locked against continued movement in this direction.

In order to avoid interference of the lower branches or sections of the draft member with each other upon tightening or loosening the draft member these sections are guided by means of two conical hollow upwardly tapering guideways $u$ which are supported on the underside of the body adjacent to the supporting roller $q$ by means of brackets $u^1$, as shown in Figs. 1, 4 and 5.

For the purpose of preventing an excessive amount of dirt or dust from entering the grooves of the clutches that side of each clutch containing the groove is provided with a cover which preferably comprises two substantially semi-circular sections V, $V^1$, as shown in Figs. 9, 11 and 12. The section V normally projects across the upper part of the groove of one of the clutches and the section $V^1$ across the lower part of said groove. The upper cover section has a tubular hub $v$ which turns loosely on the axle and the lower part has an eye $v^1$ which is mounted on the hub of the upper section and is firmly secured thereto, so that the two cover sections turn together by means of a screw clamping ring $w$ arranged on the threaded part of the hub and adapted to clamp the eye of the lower section between the upper section and said clamping ring. On one part of its periphery the lower section is provided with a radial slot $w^1$ which receives the adjacent part of the brake rod F and whereby the cover is compelled to turn with the brake rod relatively to the clutch but the brake rod is permitted to move radially toward and from the axle for entering or leaving the groove of the clutch. The cover may be additionally secured, by a bolt $x$ or otherwise, to the adjacent supporting arm of the brake rod, as shown in Fig. 9. By thus causing the cover to turn with the brake rod, the groove in the clutch is always protected from dirt and dust and at the same time the clutch is free to turn forwardly while the brake rod is in the groove thereof without in any way interfering with the cover.

My improved back-up brake for automobiles is very strong and durable, easily operated and not liable to get out of order, and the same operates with absolute certainty to prevent an automobile from backing up, thereby eliminating the danger which has heretofore attended derangement of the engine or other parts of an automobile while running the same up hill.

I claim as my invention:

1. A back-up brake for automobiles comprising a relatively stationary part and a rotatable part, a bodily movable brake member adapted to move with said rotatable part and to be shifted thereby into engagement with said stationary part, and means for connecting and disconnecting said brake member and said rotatable part.

2. A back-up brake for automobiles comprising a rotatable clutch having a circular groove, a pawl mounted on said clutch and adapted to move with its jaw into and out of the groove thereof, and a brake rod adapted to be engaged by said pawl and to be carried by the same against a relatively stationary part of the automobile.

3. A back-up brake for automobiles comprising a rotatable clutch having a circular groove, a pawl mounted on said clutch and adapted to move with its jaw into and out of the groove thereof, and to be rigid backwardly and yielding forwardly, and a brake rod adapted to project, into said groove and to be carried against a stationary part of the automobile by said pawl during the backward movement of the same with the clutch but to deflect said pawl out of said groove during the forward movement of the same with the clutch.

4. A back-up brake for automobiles comprising a rotatable clutch having a circular groove, a pawl pivoted on said clutch and adapted to project into said groove, a stop on said clutch which holds the pawl against backward movement while projecting into said groove, a spring which holds the pawl yieldingly against said stop, and a brake rod adapted to be engaged by said pawl and to be carried by the same against a relatively stationary part of the automobile.

5. A back-up brake for automobiles comprising a rotatable clutch having a large disk provided with an annular flange at its periphery and an annular row of lugs around its center and a small disk having lugs interlocking with those of the large disk and forming an annular groove between the periphery of the small disk and the flange of the large disk, a pawl mounted on said disks and movable into and out of said groove and yielding forwardly but rigid backwardly, and a brake rod adapted to be arranged in said groove and to be carried by the backward movement of the pawl against a stationary part of the automobile and to deflect said pawl out of said groove during the forward movement of said pawl with the clutch.

6. A back-up brake for automobiles comprising a circular clutch turning with a wheel of the automobile and provided with a concentric groove and a passageway leading from said groove to the periphery of said clutch, a brake rod adapted to be arranged in said groove, a pawl which is mounted on said clutch and which projects into said groove and is adapted to be rigid forwardly and carry the brake rod against a stationary part of the automobile during the backward movement of the clutch and to clear said brake rod during the forward movement of the clutch, and means for moving said brake rod through said passageway into and out of said groove.

7. A back-up brake for automobiles comprising a circular clutch turning with a wheel of the automobile and provided with a concentric groove and a passageway leading from said groove to the periphery of said clutch, a brake rod adapted to be arranged in said groove, a pawl which is mounted on said clutch and which projects into said groove and is adapted to be rigid forwardly and carry the brake rod against a stationary part of the automobile during the backward movement of the clutch and to clear said brake rod during the forward movement of the clutch, and means for moving said brake rod through said passageway into and out of said groove comprising an arm rotatable concentrically with said wheel and provided with a radial way in which said brake rod is guided.

8. A back-up brake for automobiles comprising a circular clutch turning with a wheel of the automobile and provided with a concentric groove and a passageway leading from said groove to the periphery of said clutch, a brake rod adapted to be arranged in said groove, a pawl which is mounted on said clutch and which projects into said groove and is adapted to be rigid forwardly and carry the brake rod against a stationary part of the automobile during the backward movement of the clutch and to clear said brake rod during the forward movement of the clutch, and a spring operating to hold said brake rod in said groove.

9. A back-up brake for automobiles comprising a circular clutch turning with a wheel of the automobile and provided with a concentric groove and a passageway leading from said groove to the periphery of said clutch, a brake rod adapted to be arranged in said groove, a pawl which is mounted on said clutch and which projects into said groove and is adapted to be rigid forwardly and carry the brake rod against a stationary part of the automobile during the backward movement of the clutch and to clear said brake rod during the forward movement of the clutch, a spring operating to hold said brake rod in said groove, and a flexible retracting member connected with said brake rod for moving the same out of said groove.

10. A back-up brake for automobiles comprising a circular clutch turning with a wheel of the automobile and provided with a concentric groove and a passageway leading from said groove to the periphery of said clutch, a brake rod adapted to be arranged in said groove, a pawl which is mounted on said clutch and which projects into said groove and is adapted to be rigid forwardly and carry the brake rod against a stationary part of the automobile during the backward movement of the clutch and to clear said brake rod during the forward movement of the clutch, a spring operating to hold said brake rod in said groove, a flexible retracting member connected with said brake rod for moving the same out of said groove, a drum upon which said flexible member is wound, a hand shaft for operating said drum, and a detent device for preventing backward movement of the drum.

11. A back-up brake for automobiles comprising a circular clutch turning with a wheel of the automobile and provided with a concentric groove and a passageway leading from said groove to the periphery of said clutch, a brake rod adapted to be arranged in said groove, a pawl which is mounted on said clutch and which projects into said groove and is adapted to be rigid forwardly and carry the brake rod against a stationary part of the automobile during the backward movement of the clutch and to clear said brake rod during the forward movement of the clutch, a spring operating to hold said brake rod in said groove, a flexible retracting member connected with said brake rod for moving the same out of said groove, and a guide roller over which said flexible member passes.

12. A back-up brake for automobiles comprising a circular clutch turning with a wheel of the automobile and provided with a concentric groove and a passageway leading from said groove to the periphery of said clutch, a brake rod adapted to be arranged in said groove, a pawl which is mounted on said clutch and which projects into said groove and is adapted to be rigid forwardly and carry the brake rod against a stationary part of the automobile during the backward movement of the clutch and to clear said brake rod during the forward movement of the clutch, a spring operating to hold said brake rod in said groove, a flexible retracting member connected with said brake rod for moving the same out of said groove, a guide roller over which said flexible member passes and which is adapted to be mounted on the automobile, and a hollow conical guide which is mounted on the automobile between said clutch and roller and through which said flexible member passes.

13. A back-up brake for automobiles comprising a circular clutch adapted to turn with a wheel of the automobile and having a concentric groove and a passageway leading from the groove to the periphery of the clutch, a brake rod adapted to move into and out of said groove through said way, a pawl mounted on said clutch and adapted to carry the brake rod against a stationary part of the automobile during the backward movement of the clutch and to clear said brake rod during the forward movement of the clutch, an arm which turns concentrically with said clutch and on which said brake rod is guided while moving into and out of said groove, and a cover extending over said groove of the clutch.

14. A back-up brake for automobiles comprising a circular clutch adapted to turn with a wheel of the automobile and having a concentric groove and a passageway leading from the groove to the periphery of the clutch, a brake rod adapted to move into and out of said groove through said way, a pawl mounted on said clutch and adapted to carry the brake rod against a stationary part of the automobile during the backward movement of the clutch and to clear said brake rod during the forward movement of the clutch, an arm which turns concentrically with said clutch and on which said brake rod is guided while moving into and out of said groove, and a cover extending over said groove of the clutch and comprising two sections which are frictionally connected and one of which is connected with said arm.

15. A back-up brake for automobiles comprising a circular clutch adapted to turn with a wheel of the automobile and having a concentric groove and a passageway leading from the groove to the periphery of the clutch, a brake rod adapted to move into and out of said groove through said way, a pawl mounted on said clutch and adapted to carry the brake rod against a stationary part of the automobile during the backward movement of the clutch and to clear said brake rod during the forward movement of the clutch, an arm which turns concentrically with said clutch and on which said brake rod is guided while moving into and out of said groove, and a cover extending over said groove of the clutch and comprising two semi-circular sections one of which is provided with a hub mounted on the axle of the automobile and having an annular groove and the other having a collar turning in the last mentioned groove of the other cover section and provided with a radial slot which receives the brake rod.

16. A back-up brake for automobiles comprising a stationary part or abutment, two rotatable clutches arranged on opposite sides of the automobile, and a transverse brake rod movable bodily concentrically with said clutches and adapted to be engaged near its opposite ends by said clutches and carried thereby against said stationary part.

17. A back-up brake for automobiles comprising a stationary part or abutment, two rotatable clutches arranged on opposite sides of the automobile, a transverse brake rod movable bodily concentrically with said clutches and adapted to be engaged near its opposite ends by said clutches and carried thereby against said stationary part, and a flexible draft member having a single upper run adapted to be pulled manually and a bifurcated lower part the branches of which are connected with the brake rod on opposite sides of its center.

Witness my hand this 2nd day of April, 1910.

DENNIS T. WALSH.

Witnesses:
JOSEPH T. CONATY,
JAMES MCNAMARA.